Jan. 19, 1960 F. P. HATTEN 2,921,799
TRACTOR SAFEGUARD
Filed Feb. 24, 1958
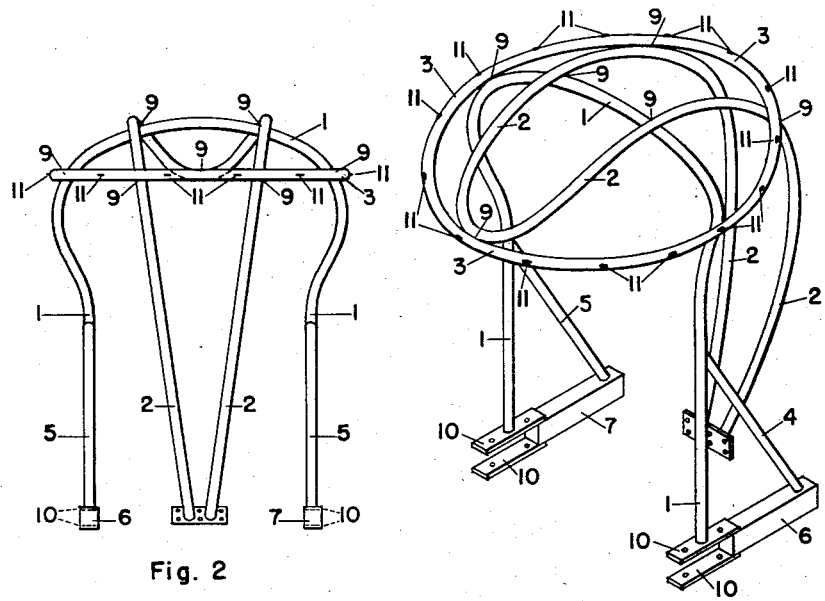
Fig. 1
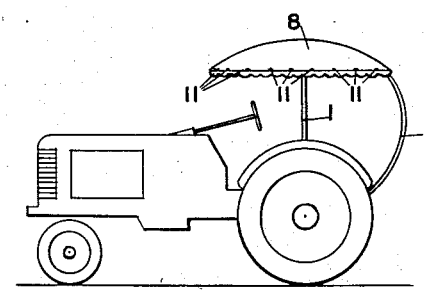
Fig. 2
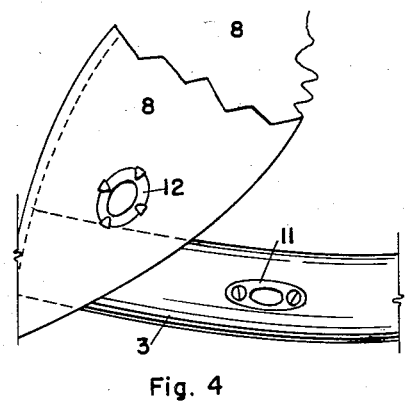
Fig. 3
Fig. 4
Faith Pauline Hatten
INVENTOR.

2,921,799

TRACTOR SAFEGUARD

Faith Pauline Hatten, Lincoln, Nebr.

Application February 24, 1958, Serial No. 717,231

1 Claim. (Cl. 280—150)

The main object of this invention is to provide a combined safety frame and canopy for a tractor which will protect the driver in case the tractor either tips over backwards or rolls over sideways.

Another object of this invention is to provide a combined safety frame and canopy for a tractor which allows the driver to get on or off the tractor seat easily.

Still another object of this invention is to provide a combined safety frame and canopy for a tractor which will not obstruct the driver's vision.

Further objects of this invention are to provide a combined safety frame and canopy of streamlined, modern appearance as well as great simplicity and strength of construction.

Individual manufacturers may be allowed great latitude in the use of materials in this invention. Bars, steel tubing, rods, or any material capable of obtaining the required objectives as set out in these patent papers, might be used. Also, individual manufacturers may provide any desired type of mounting of the unit, or change the position of the supports, if such changes do not interfere with the objectives of this invention.

The protective canopy of the tractor safeguard may be made of any suitable material, and fasten over the tractor safeguard in any way desired by the individual manufacturer. The specification of the material as "canvas," and the method of fastening as "turn buttons" is by way of example only. No patent is claimed for the method of fastening canopy.

The "tractor safeguard" is a unit consisting of steel tubes so designed and welded together, and so mounted on the tractor, as to catch the weight of the tractor in case it should tip backward or roll sideward, and thus prevent or minimize injury to the tractor driver. A safety belt should be worn by tractor driver to hold him within the protection of the "tractor safeguard."

A cover of canvas or other suitable material fastened over the top of the "tractor safeguard" will provide some protection to the driver from sun and rain.

A side view of the "tractor safeguard" is shown in Figure 1 of the accompanying drawing.

Figure 2 shows a rear view of the same.

Figure 3 shows the "tractor safeguard" on the tractor with the sun-rain cover in place.

Figure 4 shows a section of frame member equipped with turnbutton over which canopy may be fastened by means of reinforced buttonhole.

The "tractor safeguard" is mounted on the tractor at three points of support, one on each side of the driver on the axle housing, and a third point of support back and below the driver's seat. Two steel mounting plates 10, Fig. 1 and Fig. 2, are bolted to the axle housing, one on each side of the driver's seat. Each of the mounting plates have a boxed angle iron extension welded to it and extending backward. The extension is also welded to a similar steel plate which is bolted beneath the axle to the housing (see Fig. 1). A difference in tractor design or tractor model may make a different style or design or location of mounting necessary.

Steel tube 1 is welded to the axle mounting plate 10, Fig. 1 and Fig. 2, from which it extends upward and slightly outward. It arches over the driver's seat and goes down the other side where it is welded to the other axle mounting plate (see Fig. 1). Steel tube 4 acts as a support to tube 1. It is welded to tube 1 above the axle mounting plate. The other end of tube 4 is welded to the rear end of extension 6. Steel tube 5 supports tube 1 in a similar manner on the other axle extension 7.

One end of steel tube 2 is welded to its mounting plate. This mounting plate is bolted to the tractor back and below the seat. Tube 2 extends back and upward from the mounting to oval steel tube 3. It crosses under tube 3 in an arch, is welded to it at the front, bends backward in a hair pin manner and returns downward to the back mounting plate where it is welded.

Tube 3 is in the form of an oval above the driver's seat (see Fig. 1). It is welded at contact points 9, Fig. 1 and Fig. 2, to steel tubes 1 and 2 and together with them forms a canopy of steel tubes which support and reinforce each other. Tube 3 is equipped with steel turn buttons 11, Fig. 4, evenly spaced around the outside of the oval. A sun-rain cover 8 of canvas or other suitable material is buttoned to oval tube 3 as shown in Fig. 3 by steel reinforced button holes 12, Fig. 4, around the outside.

I claim:

A combined safety frame and canopy for a tractor comprising, a first frame member of steel tubing having one end secured to the axle housing of the tractor on one side of the driver's seat, extending upwardly and outwardly above the tractor wheel, curving over and across the driver's seat and extending downwardly and inwardly with the other end secured to the axle housing on the other side of the driver's seat, a second frame member having one end secured to the tractor frame behind and below the driver's seat, extending upwardly and rearwardly, arching over and extending forwardly of the first frame member, then turning in a hairpin manner and extending rearwardly in a similar manner with the other end secured to the tractor frame adjacent the said one end, and a reinforcing, oval shaped third frame member located directly above the driver's seat and in contact with the first and second frame members, all three frame members being welded together firmly where they touch, the third frame member being equipped with turn buttons for fastening the canopy thereto.

References Cited in the file of this patent

UNITED STATES PATENTS

| | | |
|---|---|---|
| 2,783,056 | Belk | Feb. 26, 1957 |
| 2,785,002 | Schumaker | Mar. 12, 1957 |
| 2,828,970 | Ivey | Apr. 1, 1958 |